United States Patent [19]
Miura et al.

[11] 3,946,406
[45] Mar. 23, 1976

[54] RECORDER

[75] Inventors: Shigetaka Miura; Masashi Oikawa, both of Musashino, Japan

[73] Assignee: Kabushikikaisha Yokogawa Denki Seisakusho, Tokyo, Japan

[22] Filed: Sept. 5, 1974

[21] Appl. No.: 503,282

[30] Foreign Application Priority Data
Oct. 25, 1973 Japan.............................. 48-120115

[52] U.S. Cl. .............................................. 346/145
[51] Int. Cl.² .................. G01D 11/24; G01D 11/30
[58] Field of Search............................ 346/136, 145

[56] References Cited
UNITED STATES PATENTS
2,888,310  5/1959  Perry ............................ 346/145 X
3,731,318  5/1973  Dickey.............................. 346/145

*Primary Examiner*—L. T. Hix
*Assistant Examiner*—Stanley J. Witkowski
*Attorney, Agent, or Firm*—Moonray Kojima

[57] ABSTRACT

A recorder comprising a flat bed disposed toward the upper portion of a recorder case and equipped with a built-in chart feed wheel, and a chart storage area located below the flat bed and within the recorder case. The flat bed is made movable in the chart feed direction and, as the flat bed is moved the feed wheel is moved therewith and an opening is formed in the recorder case to allow the storage area to be exposed and the chart material stored therein to be readily accessible.

9 Claims, 7 Drawing Figures

RECORDER

BACKGROUND OF THE INVENTION

1. Field of the Invention

The present invention relates to recorders, and more particularly to recorders of the type having a flat bed. This type of recorder is generally of a construction in which a chart, when recording, is held flat on a flat bed to enable convenient viewing of the trace of recording. The size of the flat bed is suitably determined for this purpose, and a blank chart is stored in a suitable holder disposed typically in the back of the flat bed. Then, when a chart is desired to be placed in the holder or withdrawn therefrom, the flat bed is moved to provide access to the holder. In replacing the chart it is necessary to engage and disengage the chart perforations with and from the sprocket teeth of a chart feed wheel which is usually attached to the recorder case. For these reasons, it is desirable to provide a recorder having an arrangement capable of simplifying chart replacement.

2. Description of the Prior Art

The prior art flat bed type recorder is of a construction in which the chart feed wheel is installed independent of the movement of the flat bed. It rotates to draw the chart from the back of the flat bed and move the chart on the top surface of the flat bed. One disadvantage to this type of construction is that when the chart is replaced, because the chart must be passed through the back of the chart feed wheel, the chart perforations must be engaged with or disengaged from the sprocket teeth when moving the flat bed. This has hampered prompt replacement of the chart. This disadvantage is especially prevalent on recorders mounted vertically on a rack. Another disadvantage is that with the prior art recorder it is virtually impossible to unload the chart before its end unless the chart is torn off at that point. Furthermore, to have access to the chart storage area, it is necessary to swing out of the flat bed. In practice, the flat bed, when carrying a chart on it, cannot easily be opened, which makes it difficult to see how much chart material remains in the storage space.

SUMMARY OF THE INVENTION

The recorder of the invention aims to eliminate the aforementioned and other disadvantages and deficiencies of the prior art because the flat bed is equipped with a built-in chart feed wheel and is movable in the chart feed direction to expose the chart storage area located below the flat bed and within the recorder case.

A feature of the invention is a flat bed type recorder in which the chart perforations can easily be engaged with and disengaged from the sprocket teeth of the feed wheel, thus enabling easy chart replacement.

Another feature of the invention is a flat bed type recorder in which the chart can easily be replaced regardless of whether the chart is partially used.

Still another feature of the invention is a flat bed type recorder in which the amount of unused chart material can easily be checked.

An important feature of the invention is the integral construction of the flat bed and the feed wheel, and the drive means location in the case, whereby the flat bed can be moved together with the feed wheel and disengaged from the drive means.

BRIEF DESCRIPTION OF THE DRAWINGS

FIG. 3 being a cross-sectional view taken along Section Line III—III in FIG. 2;

DESCRIPTION OF PREFERRED EMBODIMENT

Figure 1:
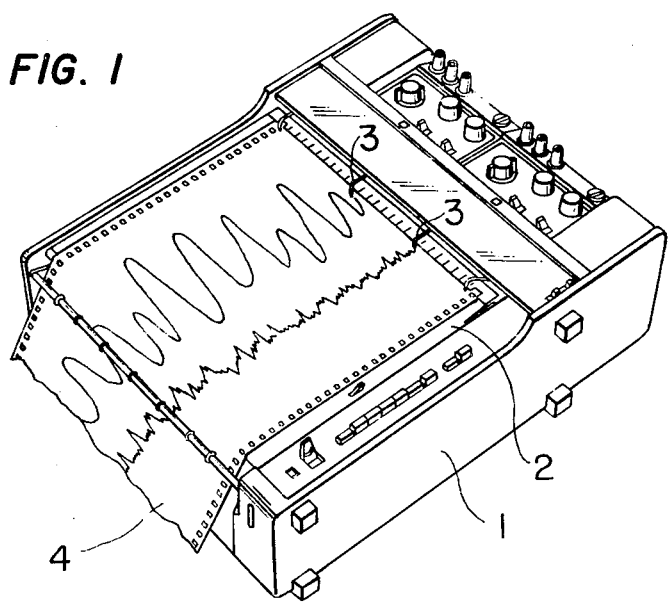
FIG. 1 is a perspective view of an illustrative embodiment of the invention.
Figure 2:
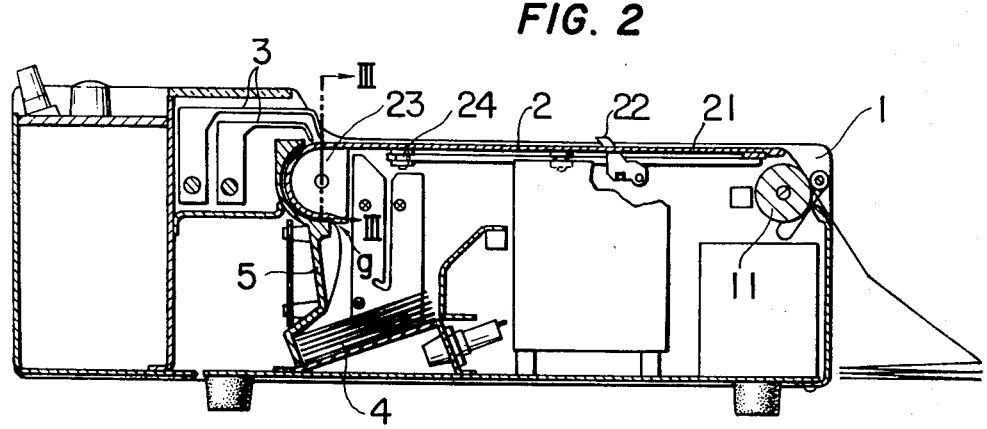
FIG. 2 is a sectional elevational view showing the internal construction of the embodiment of FIG. 1.

Referring now to FIG. 1, an illustrative recorder of the invention is shown, comprising an instrument case 1, a flat bed 2 on which chart paper 4 may be disposed, recording elements 3 connected to suitable operative mechanisms (not shown in detail) located within the case 1, and various operational switches, knobs, etc. For simplification and clarity of description, only the essential elements of the invention are shown in detail. The remaining parts can be found in literature describing conventional recorders, such as for example the recording mechanisms and control elements. The components are arranged in the manner shown in FIG. 2. Flat bed 2 comprises a flat surface such as of any suitable material 21, lock means 22, feed means 23, and roller means 24. The flat bed is mounted in the upper portion of the recorder case 1 in a manner to be described hereinafter in greater detail.

Located within case 1, and spacially below the top bed or unit 2 is guide 5 for properly aligning the chart to the feed wheel, and a chart storage means having no numeral designation. This guide has a cylindrically concave surface which suitably fits the cylindrically convex surface of feed means 23. The chart 4 is led out by way of a gap g between the feed means 23 and the guide 5. A roller 11 attached to the case 1 toward the opposite end of top unit 2, serves to apply suitable tension to and stretch the chart 4 over the flat bed 2 so that the recording can be accurate and legible.

Figure 3:
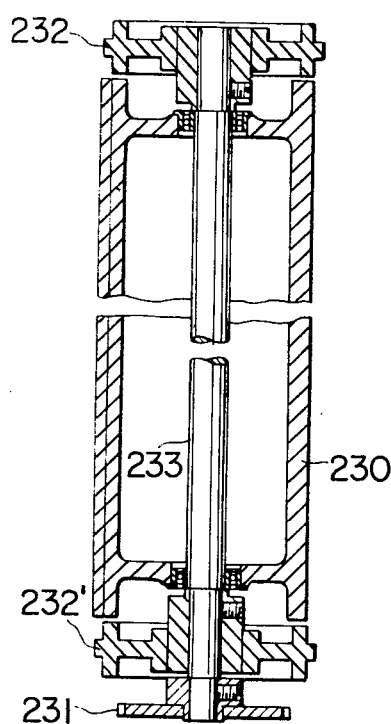
FIG. 3, FIGS. 4A and 4B, are partial sectional views of the construction shown in FIG. 2.

The details of the feed means 23 are shown in FIG. 3 and comprises a support structure 230, a gear 231, feed wheels 232 and 232', both having sprockets thereon for alignment with the perforations on the edges of the chart, and a rotatable shaft 233, movably supported by support structure 230. The gear 231, and feed wheels 232 and 232' are fastened to rotating shaft 233 as depicted.

Figure 4A:
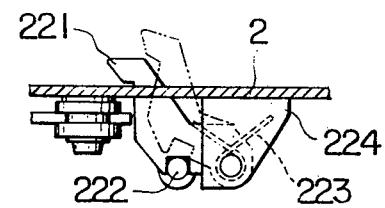
Figure 4B:
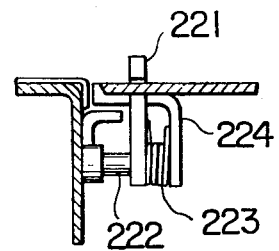

FIGS. 4A and 4B show details of the lock means 22, which comprises a flat catch plate 221, a spring 223 suitably held on a shaft (not numbered), and mounting member 224. The catch plate 221 is rotatable about the shaft in relation to the mounting member 224, and its tip end is projected above the flat bed top surface, as depicted in FIG. 4A. This cut out portion engages with a fixed pin 222 by the force of spring 223. The purpose of the catch plate 221 and pin 222 is to lock the flat bed 2 in an operative position, i.e. when the writing elements 3 are in position to record on chart 4, and as will be discussed hereinafter, the drive means 12 is engaged with gear 231. The flat-bed 2 can be moved to the right in FIG. 4A by manually moving knob projection 221 to the right against the tension of spring 223 and slightly upward, and thereby disengage catch plate 221 from pin 222. That is, when the catch plate is moved upward rotatably about its shaft, the cut out portion will disengage from pin 222, thereby unlocking the flat bed 2 from its operative position and permitting movement thereof to the right to an open position.

Figure 5:
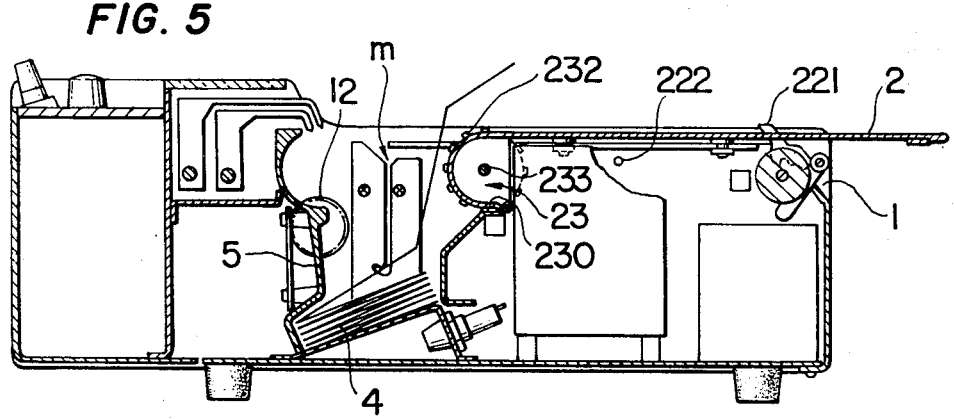
FIG. 5 is a sectional view showing the internal mechanism of the embodiment of FIG. 1.
Figure 6:
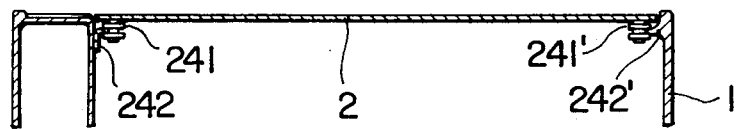
FIG. 6 is a sectional view showing mechanism for moving the flat bed.

FIG. 5 depicts the state of the flat bed 2 when moved to an open position. The flat bed 2 is installed on rails 242 and 242' both attached to the case 1, with rollers 241 and 241' both attached to the flat bed 2, and located in the upper part of the case 1 (see FIG. 6). The flat bed 2 may be moved in a plane substantially parallel to the top surface of flat bed 2, to the right along the upper part of recorder case 1, to the open position, with the result that the part between the feed means 23 and the guide 5 is widely opened and the chart storage area becomes exposed and readily accessible. Because the feed wheel 232 moves with the flat bed 2 (as shown in FIG. 5), the chart 4 can be pulled out or placed in position without the need for engaging or disengaging the chart with or from the feed wheel 232, as would be the case with prior art recorders. This simplifies chart removal.

When the chart is of the flat folding type as depicted in FIG. 5, the chart may be placed flat on the bottom of the storage means. When the chart is of the roll type, the chart may be placed in position by fitting a shaft, on which the roll can be mounted at its axis, in the guide grooves m disposed on the opposing inner walls of the recorder case 1 (see FIG. 5). To store the chart 4 in position for use, the flat bed 2 is moved back to the left toward the operative position, after filling. At the same time the chart 4 is caused to have its perforations to engage with the sprocket teeth of the feed wheels 232 and 232'. When the flat bed 2 is moved back to its extreme (i.e. operative) position catch plate cut out engages with pin 222 and thus the flat bed 2 is locked in the operative position, and the drive gear 12 engages with the gear 231 of the feed means 23. The recorder is thus ready for operation.

Because the chart storage mechanism operates as described above, the chart can easily be replaced even if the recorder is mounted vertically on a rack, as opposed to the prior art construction in which the chart must be passed through behind the feed wheel whenever the chart is replaced. Furthermore, according to the invention, a chart only partially used can readily be replaced with another. Still further, by simply moving the flat bed 2 to the right, with catch plate 221 unlocked from pin 222, the chart storage area is opened and exposed to permit easy checking and replacement of the stock of blank charts.

While one specific embodiment of the invention has been described in detail, it is to be understood that this is for the purpose of illustrating the invention and should not be construed as necessarily limiting the scope of the invention.

What is claimed is

1. A recorder comprising: a flat bed disposed on top of a case holding a chart thereon and movable in the direction of said chart being transmitted and also in the contrary direction thereof; a cylindrical support member fixed at one end of said flat bed and located within said case; a chart feed wheel supported at two ends of a rotating shaft extended in said cylindrical support member in its axial direction; a chart storage part disposed in a recess in the case, yet readily accessible through an opening formed on the case as said flat bed is moved; and a chart arranged in said chart storage part to be sent out gradually by said chart feed wheel over the flat bed by way of said cylindrical support member.

2. A recorder as claimed in claim 1 comprising: a knob rotatably mounted to a mounting member and given a reset torque by a spring, said knob having one end projected above the flat bed and having a cut portion beneath the flat bed, and the cut portion engaging with a pin fastened to a fixed member, and thus determining the position of the flat bed; and an opening to be formed on the recorder case when the flat bed is moved in the chart feed direction by disengaging the cut portion of the knob from the pin through lifting the end of the knob.

3. A recorder as claimed in claim 1 comprising a fold type blank chart placed on the bottom of the chart storage part, and a roll type blank chart placed with its rool shaft fitted to guide grooves disposed on the opposing inner walls of the recorder case in the opening part.

4. In a recorder comprising a case; a horizontally positioned flat bed disposed on top of said case for holding a chart horizontally movable thereon; storing means located below said flat bed and within said case for storing blank charts; writing means disposed to be contactable with said chart to mark said chart; the combination comprising
   A. feed means attached to said flat bed toward one end thereof for continuously feeding said blank charts from a position in said storing means to the top surface of said flat bed and extending from said one end to the other end of said flat bed;
   B. drive means attached to said case and engageable with said feed means for driving said feed means thereby to cause said feed means to feed and move said chart to and on said top surface of said flat bed;
   C. means for enabling manual movement of said flat bed in a direction parallel to the flat top surface thereof, whereby when said flat bed is moved together with said feed means and is in an open position, said storing means is exposed to permit ready access to said blank charts, said feed means being disengaged from said drive means in said open position; and when said flat bed is in an operative position, said feed means and said drive means are engaged with each other and said chart is fed to and movable on said top surface and said writing means is in contact with said chart; and
   D. lock means attached to said flat bed for holding said flat bed in said operative position, and upon operation of said lock means to an unlock position, said flat bed being movable together with said feed means to said open position, said blank charts being held in said storing means.

5. The recorder of claim 4, wherein said feed means comprises a circular structure, a shaft rotatably mounted at the axis of said structure, a pair of chart feed wheels supported at two ends of said structure by said shaft, said wheel having sprocket teeth for engaging perforations in said chart, and gear means attached to said shaft and engagable with said drive means.

6. The recorder of claim 4, wherein said lock means comprises a flat catch plate having a cut out portion mounted rotatably on a shaft, said shaft being mounted on a mounting member spring means for normally holding said catch plate in a closed position, a pin disposed adjacent to said catchplate whereby in said closed position said catch plate cut out is engaged with said pin, said catch plate also having an extended projection disposed above said flat top surface and manually movable against the tension of said spring whereby said catch plate cut out portion is moved away from said pin to an open position prior to movement of said flat bed to said open position.

7. The recorder of claim 4, wherein said chart is a folded continuous flat sheet of paper disposed at the bottom of said storage area, and further comprising guide structure connected to said case and disposed adjacent to said feed means of said flat bed, whereby said paper is fed between said guide structure and said feed means.

8. The recorder of claim 4, further comprising means within said case for holding a roll type chart paper, said means comprising a pair of guide slots disposed on opposite sides of said case.

9. The recorder of claim 4, further comprising a tension means located at the other end of said flat bed for engaging said chart and providing tension thereto to enable said chart to be substantially flat on said flat top surface.

* * * * *